(12) United States Patent
Chen et al.

(10) Patent No.: US 10,628,078 B2
(45) Date of Patent: Apr. 21, 2020

(54) DATA ACCESS METHOD AND RELATED DEVICE (71) Applicant: Huawei Technologies Co., Ltd., Shenzhen (CN)

(72) Inventors: Zhongxian Chen, Shenzhen (CN); Xianjun Zou, Shenzhen (CN); Lianxi Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/307,658

(22) PCT Filed: Jun. 6, 2017

(86) PCT No.: PCT/CN2017/087273
§ 371 (c)(1),
(2) Date: Dec. 6, 2018

(87) PCT Pub. No.: WO2017/211260
PCT Pub. Date: Dec. 14, 2017

(65) Prior Publication Data
US 2019/0310954 A1 Oct. 10, 2019

(30) Foreign Application Priority Data
Jun. 6, 2016 (CN) .......................... 2016 1 0395894

(51) Int. Cl.
G06F 3/06 (2006.01)
G06F 13/20 (2006.01)
(Continued)

(52) U.S. Cl.
CPC .......... *G06F 3/0655* (2013.01); *G06F 3/0664* (2013.01); *G06F 13/10* (2013.01);
(Continued)

(58) Field of Classification Search
CPC ........ G06F 13/10; G06F 13/102; G06F 13/14; G06F 13/20; G06F 13/4282;
(Continued)

(56) References Cited

U.S. PATENT DOCUMENTS 9,483,492 B2* 11/2016 Choi ...................... G06F 16/182
2007/0079019 A1* 4/2007 Hu ........................... G06F 21/85
710/36

(Continued)

FOREIGN PATENT DOCUMENTS

CN 1889014 A 1/2007
CN 101452435 A 6/2009
(Continued)

OTHER PUBLICATIONS

Foreign Communication From a Counterpart Application, European Application No. 17809699.6, Extended European Search Report dated Apr. 11, 2019, 9 pages.
(Continued)

Primary Examiner — Thomas J. Cleary
(74) Attorney, Agent, or Firm — Conley Rose, P.C.

(57) ABSTRACT

A data method and a related device to resolve a disadvantage encountered when a first device accesses data of a second device. The method is applied to the first device, and the first device is coupled to the second device using a Universal Serial Bus (USB) interface. The method includes displaying, by the first device, an interface to which the second device is mapped, accessing data of the second device using the interface, receiving, by the first device, an instruction entered for the interface, displaying the data of the second device, receiving, by the first device, an operation instruction entered for the data, and processing, by the first device, the data according to the operation instruction.

20 Claims, 6 Drawing Sheets (51) Int. Cl.
*G06F 13/42* (2006.01)
*G06F 13/10* (2006.01)

(52) U.S. Cl.
CPC ............ *G06F 13/102* (2013.01); *G06F 13/20* (2013.01); *G06F 13/4282* (2013.01); *G06F 2003/0697* (2013.01); *G06F 2213/0042* (2013.01)

(58) Field of Classification Search
CPC ........... G06F 2213/0042; G06F 3/0655; G06F 3/0656; G06F 3/0658; G06F 3/0659; G06F 3/0662; G06F 3/06664; G06F 2003/0697; G06F 13/105; G06F 13/1668
See application file for complete search history.

(56) References Cited

U.S. PATENT DOCUMENTS

| | | | |
|---|---|---|---|
| 2007/0222955 A1* | 9/2007 | Kubota | G06F 3/14 355/18 |
| 2009/0216520 A1 | 8/2009 | Khan et al. | |
| 2010/0241768 A1* | 9/2010 | Chiang | G06F 3/04817 710/16 |
| 2011/0179083 A1* | 7/2011 | Galloway | G06F 13/385 707/783 |
| 2013/0060918 A1* | 3/2013 | Butler | H04L 67/025 709/220 |
| 2013/0227177 A1 | 8/2013 | Cho | |
| 2014/0040290 A1 | 2/2014 | Wei | |
| 2014/0067957 A1* | 3/2014 | Yamada | H04L 12/1822 709/204 |
| 2015/0339242 A1 | 11/2015 | Huang | |
| 2016/0077982 A1 | 3/2016 | Ding | |
| 2016/0139721 A1 | 5/2016 | Richmond et al. | |
| 2016/0140076 A1* | 5/2016 | Doe | G06F 13/4282 710/302 |
| 2016/0217093 A1* | 7/2016 | Whittington | H04L 12/462 |
| 2018/0276148 A1 | 9/2018 | Ding | |

FOREIGN PATENT DOCUMENTS

| | | |
|---|---|---|
| CN | 102216917 A | 10/2011 |
| CN | 104216840 A | 12/2014 |
| EP | 1486866 A1 | 12/2004 |
| JP | 2014049080 A | 3/2014 |

OTHER PUBLICATIONS

Foreign Communication From a Counterpart Application, Chinese Application No. 201610395894.8, Chinese Office Action dated Apr. 10, 2019, 9 pages.

Machine Translation and Abstract of Chinese Publication No. CN1889014, Jan. 3, 2007, 12 pages.

Machine Translation and Abstract of Chinese Publication No. CN101452435, Jun. 10, 2009, 14 pages.

Foreign Communication From a Counterpart Application, PCT Application No. PCT/CN2017/087273, English Translation of International Search Report dated Aug. 25, 2017, 2 pages.

Foreign Communication From a Counterpart Application, PCT Application No. PCT/CN2017/087273, English Translation of Written Opinion dated Aug. 25, 2017, 4 pages.

Machine Translation and Abstract of Japanese Publication No. JP2014049080, Mar. 17, 2014, 64 pages.

Foreign Communication From a Counterpart Application, Japanese Application No. 2018-563707, Japanese Office Action dated Dec. 17, 2019, 3 pages.

Foreign Communication From a Counterpart Application, Japanese Application No. 2018-563707, English Translation of Japanese Office Action dated Dec. 17, 2019, 3 pages.

\* cited by examiner

DATA ACCESS METHOD AND RELATED DEVICE

CROSS-REFERENCE TO RELATED APPLICATIONS

This application is a U.S. National Stage of International Patent Application No. PCT/CN2017/087273 filed on Jun. 6, 2017, which claims priority to Chinese Patent Application No. 20160395894.8 filed on Jun. 6, 2017. Both of the aforementioned applications are hereby incorporated by reference in their entireties.

TECHNICAL FIELD

The present invention relates to the field of communications technologies, and specifically, to a data access method and a related device.

BACKGROUND

Figure 1:
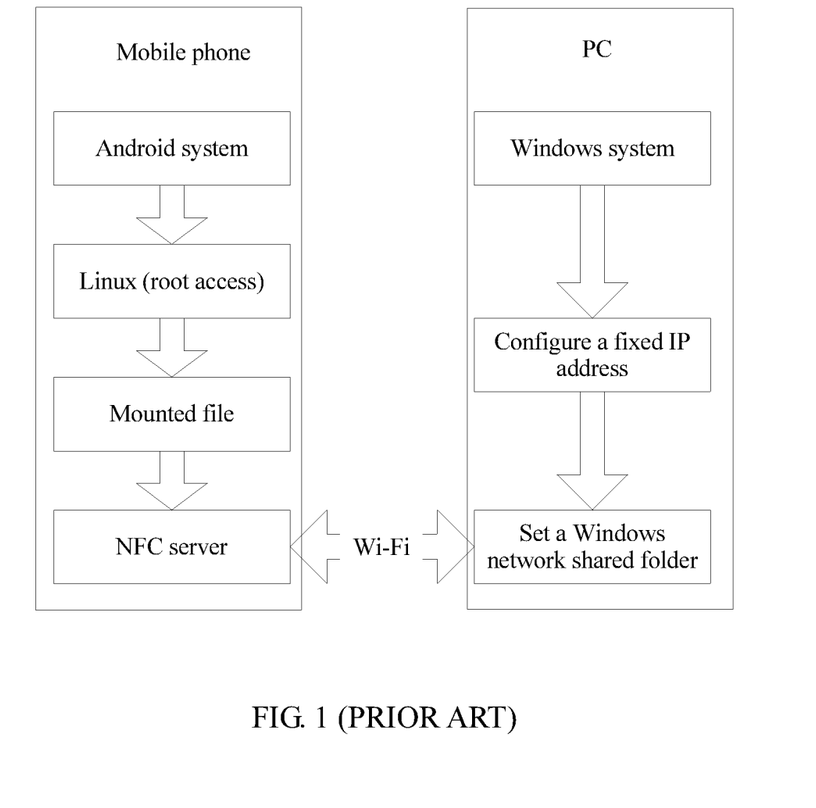
FIG. 1 is a schematic structural diagram of access of a mobile phone to data of a PC in the prior art.

Currently, a mobile phone can be connected to a personal computer (English full name: Personal Computer, PC for short) by using Wireless-Fidelity (English full name: Wireless-Fidelity, Wi-Fi for short), so as to access data of the PC. As shown in FIG. 1, a Linux system in an Android (English: Android) mobile phone provides a computer term: root access, so that the mobile phone accesses the data of the PC by mounting a network shared file on the Linux end. A specific implementation process is as follows: First, a root file package needs to be installed on the mobile phone, to enable the mobile phone to obtain the root access. Next, a network file system (English full name: Network File System, NFS) server is configured in the Linux end, and the NFS server is started. Then, an NFS file is mounted by mounting the network shared file on the Linux end, so that data of a Windows system on the PC may be directly mapped to the mobile phone, enabling the mobile phone to access the data of the computer.

However, the mobile phone can access the data of the PC only when the mobile phone and the PC are connected to a network and a fixed Internet Protocol (English full name: Internet Protocol, IP for short) address is configured on the PC. The operation is complex.

SUMMARY

An objective of the present invention is to provide a data access method and a related device, to resolve a prior-art disadvantage encountered when a mobile phone accesses data of a PC.

According to a first aspect of the present invention, a data access method is provided. The method is applied to a first device, and the first device is connected to a second device by using a Universal Serial Bus USB interface. The method includes: displaying, by the first device, an interface to which the second device is mapped, and accessing data of the second device by using the interface; receiving, by the first device, an instruction entered for the interface, and displaying the data of the second device; receiving an operation instruction entered for the data; and processing the data according to the operation instruction.

It can be learned that the first device is connected to the second device by using the USB interface. This effectively improves a data transmission rate in comparison with the prior art. The first device displays the interface to which the second device is mapped and accesses the data of the second device by using the interface. It can be learned that the second device serves as a virtual storage unit of the first device, thereby expanding storage space of the first device. In this way, the first device can display the data of the second device when receiving the instruction entered for the interface. Further, the first device receives the operation instruction entered for the data and processes the data according to the operation instruction. The operation is simple, and no extra IP address needs to be configured, thereby improving flexibility of interaction between the devices.

In some implementations, the receiving, by the first device, an operation instruction entered for the data specifically includes: receiving, by the first device, a selection operation instruction entered for the data, and determining target data; and receiving, by the first device, a processing operation instruction entered for the target data; and the processing, by the first device, the data according to the operation instruction specifically includes: performing, by the first device, an operation corresponding to the processing operation instruction on the target data according to the processing operation instruction.

It can be learned that the first device receives the selection operation instruction entered for the data, and determines the target data, for example, selects some data from the data of the second device as the target data. The operation is simple. Further, the first device receives the processing operation instruction entered for the target data and performs the operation corresponding to the processing operation instruction on the target data according to the processing operation instruction, for example, deleting, modifying, or copying the target data. This is not specifically limited herein.

In some other possible implementations, before the processing, by the first device, the data according to the operation instruction, the method further includes: receiving, by the first device, a control request sent by the second device; and the processing, by the first device, the data according to the operation instruction specifically includes: sending, by the first device, the operation instruction to the second device based on the control request, where the operation instruction is used to instruct the second device to process the data according to the operation instruction.

It can be learned that an access mode has been customized before the first device accesses the data of the second device, and therefore, the first device accesses the data of the second device based on the customized access mode. For example, the first device needs to send the operation instruction to the second device in response to the control request sent by the second device, so that the second device processes the data according to the operation instruction. The operation is simple, and the first device accesses the data of the second device.

In some other possible implementations, a mass storage driver is installed on the first device, a USB upper-layer application driver is installed on the second device, a same parameter is defined on the mass storage driver and the USB upper-layer application driver, and the first device interacts with the second device based on the same parameter.

It can be learned that, before the first device is connected to the second device by using the USB interface, to implement access of the first device to the data of the second device, the mass storage driver is installed on the first device, the USB upper-layer application driver is installed on the second device, and the same parameter is defined on the mass storage driver and the USB upper-layer application driver, so that operation modes of the two drivers are consistent, enabling the first device to correctly access the data of the second device.

In some other possible implementations, the parameter includes USB functional interface information, and the USB functional interface information includes information about an access mode in which the first device accesses the data of the second device.

During actual application, the parameter includes USB functional interface information, device information, endpoint information in the USB interface, or the like. The access mode is defined by using a USB functional interface. For example, the USB functional interface information includes the information about the access mode in which the first device accesses the data of the second device. When the first device and the second device are connected by using the USB interface, the second device identifies the access mode information, so that the first device accesses the data of the second device based on the customized access mode.

In some other possible implementations, the first device is a terminal, and the second device is a personal computer PC. It can be learned that the first device is a secondary device, and the second device is a primary device. The secondary device accesses the data of the primary device in a primary/secondary access mode.

According to a second aspect of the present invention, a data access method is provided. The method is applied to a second device, the second device is connected to a first device by using a Universal Serial Bus USB interface, a USB upper-layer application driver is installed on the second device, and a parameter for interacting with the first device is defined on the USB upper-layer application driver. The method includes: generating, by the second device, a control request; and sending, by the second device, the control request to the first device, where the control request is used to instruct the first device to send an operation instruction to the second device.

It can be learned that the second device is connected to the first device by using the USB interface. This effectively improves a data transmission rate in comparison with the prior art. The second device is connected to the first device by using the Universal Serial Bus USB interface. The USB upper-layer application driver is installed on the second device, and the parameter for interacting with the first device is defined on the USB upper-layer application driver, so that the first device correctly accesses data of the second device. Further, the second device generates the control request and sends the control request to the first device, where the control request is used to instruct the first device to send the operation instruction to the second device. The operation is simple, and no extra IP address needs to be configured, thereby increasing flexibility of interaction between the devices.

In some possible implementations, the second device receives the operation instruction sent by the first device, and the second device processes target data according to the operation instruction.

It can be learned that an access mode has been customized before the first device accesses the data of the second device, and therefore, the first device accesses the data of the second device based on the customized access mode. For example, the first device needs to send the operation instruction to the second device in response to the control request sent by the second device, so that the second device processes the data according to the operation instruction. The operation is simple, and the first device accesses the data of the second device.

In some other possible implementations, the parameter includes USB functional interface information, and the USB functional interface information includes information about an access mode in which the first device accesses the data of the second device.

During actual application, the parameter includes USB functional interface information, device information, endpoint information in the USB interface, or the like. The access mode is defined by using a USB functional interface. For example, the USB functional interface information includes the information about the access mode in which the first device accesses the data of the second device. When the first device and the second device are connected by using the USB interface, the second device identifies the access mode information, so that the first device accesses the data of the second device based on the customized access mode.

In some other possible implementations, the first device is a terminal, and the second device is a personal computer PC. It can be learned that the first device is a secondary device, and the second device is a primary device. The secondary device accesses the data of the primary device in a primary/secondary access mode.

According to a third aspect, an operation device is provided. The operation device is configured to implement a function of the method provided in the first aspect or any possible implementation of the first aspect, or the second aspect or any possible implementation of the second aspect, and is implemented by hardware/software, and the hardware/software includes a unit corresponding to the function.

BRIEF DESCRIPTION OF DRAWINGS

FIG. 2-*a* is a schematic structural diagram of a framework of a system according to an embodiment of the present invention;

FIG. 2-*b* is a schematic structural diagram of a first device according to an embodiment of the present invention;

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the specification, claims, and accompanying drawings of the present invention, the terms "first", "second", "third", "fourth", and the like are intended to distinguish between different objects but do not indicate a particular order. Moreover, the terms "including", "comprising", and any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Figure 2A:
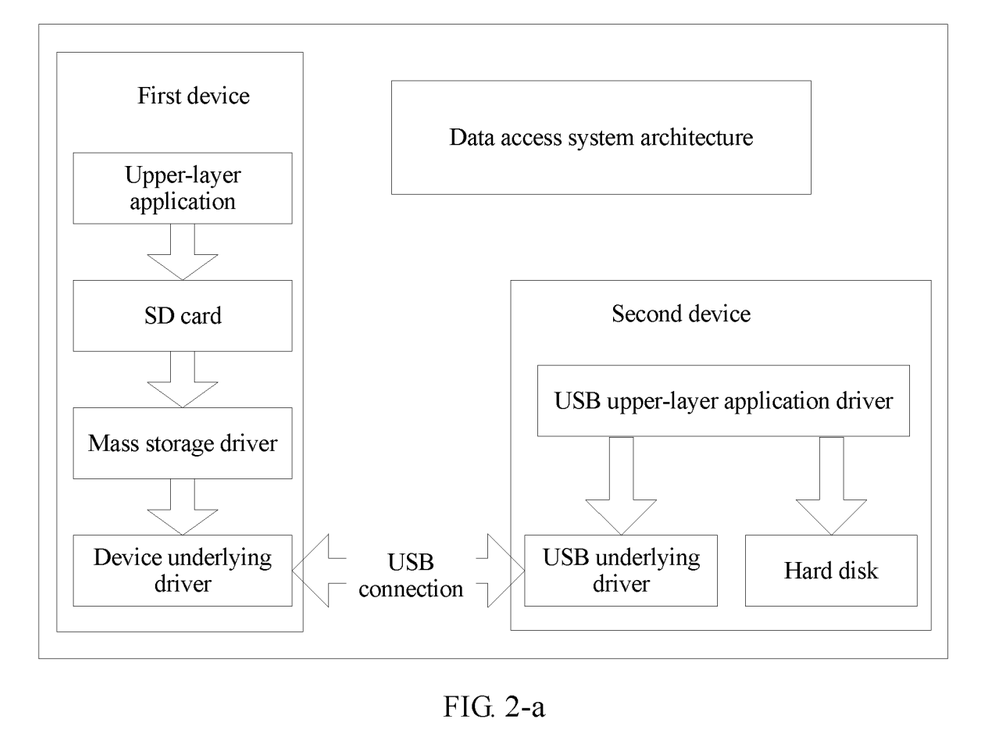

FIG. 2-*a* shows a framework diagram of a system in an embodiment of the present invention. The system includes a first device and a second device. The second device may be connected to a plurality of first devices. For example, the first device is a terminal, and the second device is a PC. A customized mass storage (mass_storage) driver is created on the first device, and a customized USB upper-layer application driver is created on the second device. The customized USB upper-layer application driver runs in a kernel of the second device. The first device and the second device are connected by using a USB interface. A specific process of creating the customized mass storage driver on the first device is as follows: The mass storage driver is created on the first device based on a mass storage protocol, and information about the first device such as a device descriptor, a USB interface descriptor, and an endpoint descriptor in the USB interface is defined on the mass storage driver. The device descriptor is used to define information about the first device such as a type, a vendor code, a product identifier, a vendor descriptor, a USB protocol version. The USB interface descriptor is used to define information such as a type of the USB interface, and one USB interface corresponds to a specific function. The endpoint descriptor is used to define a specific function of each endpoint in the USB interface. For example, an input endpoint is used to enter data received from the second device, and an output endpoint is used to output data to the second device. A specific process of creating the customized USB upper-layer application driver on the second device is as follows: A USB driver development tool corresponding to a platform of the second device is selected, the USB upper-layer application driver is created, and the information about the first device that needs to be bound such as the device descriptor, the USB interface descriptor, and the endpoint descriptor in the USB interface is defined on the USB upper-layer application driver. The information about the first device defined on the USB upper-layer application driver is consistent with the information about the first device defined on the mass storage driver, to ensure that operation modes of the upper-layer application USB driver and the mass storage driver are consistent.

To implement an access mode in which the first device accesses data of the second device, a USB functional interface corresponding to the access mode is developed. For example, a plurality of USB functional interfaces may be defined for a USB physical port through protocol development, and the USB functional interfaces are virtual interfaces obtained through protocol mapping. The USB functional interfaces correspond to specific functions. When the first device is connected to the second device by using a USB interface, the second device is mapped to a USB functional interface for accessing the data of the second device. The second device automatically loads the customized USB upper-layer application driver based on corresponding USB functional interface information, and mounts the data of the second device on the first device in a form of an SD card, to map the data of the second device to the first device, enabling the first device to access the data of the second device. After the customized USB upper-layer application driver runs normally, the second device communicates with the first device based on an interface mode defined on the USB functional interface. For example, to cooperate with the first device to actively access the data of the second device, the second device needs to send a control request to the first device, so that when determining to access the data of the second device, the first device returns an operation instruction to the second device based on the control request. After receiving the operation instruction returned by the first device, the second device executes the corresponding operation instruction, so that the first device accesses the data of the second device.

When the first device accesses the data of the second device, the first device returns the operation instruction to the second device based on the control request sent by the second device. The operation instruction specifically includes traversing, writing, reading, deleting, modifying, creating, moving, copying, transmitting, or adding the data of the second device, and the like. For example, when the first device needs to traverse data of the second device, after receiving the control request sent by the second device, the first device returns an operation instruction for traversing a specific piece of data of the second device to the second device based on the control request. After receiving the operation instruction, the second device traverses the corresponding data of the second device to obtain a traversal result (for example, information about traversed files), and sends the information about traversed files to the first device. If the information about traversed files is in a particularly large volume and exceeds a maximum quantity of bytes allowed to be sent by the second device in one batch, the information about traversed files may be sent to the first device for a plurality of times. For another example, when the first device needs to delete data of the second device, after the first device receives the control request sent by the second device, the first device returns an operation instruction for deleting a specific piece of data of the second device to the second device based on the control request. After receiving the operation instruction, the second device deletes the corresponding data of the second device and returns a deletion result to the first device.

It should be noted that the technical solutions of the present invention are applied to an Android system, or may be applied to another operating system, for example, a MAC system or a Windows system. This is not specifically limited herein. In this embodiment of the present invention, the first device may be a secondary device, and the second device may be a primary device. The following describes two data processing implementations in the present invention by using an example in which the first device is a terminal and the second device is a PC.

Implementation 1:

Before the terminal and the PC are connected, a mass storage driver is first installed on the terminal. The mass storage driver is a customized driver. A USB upper-layer application driver is installed on the PC. The USB upper-layer application driver is a customized upper-layer application driver. A same parameter is separately defined on the mass storage driver and the USB upper-layer application driver, for example, a device descriptor, a USB interface descriptor, an endpoint descriptor in a USB interface. This ensures that after the terminal and the PC are connected by using the USB interface, operation modes of the drivers are consistent, facilitating data exchange.

To implement an access mode in which the terminal accesses data of the PC, a USB functional interface corresponding to the access mode is developed. When the terminal is connected to the PC by using the USB interface, the PC is mapped to the USB functional interface corresponding to the access mode. The PC automatically loads the USB upper-layer application driver based on corresponding USB functional interface information, mounts the data of the PC on the terminal in a form of a virtual SD card, and displays the data on a display screen of the terminal by using the mapped interface, so that the terminal can display the data of the PC on a user interface of the display screen. A user may also view the data of the PC from a display interface of the terminal. The customized mass storage driver on the terminal and the customized upper-layer application driver on the PC implement data access and exchange by using a customized command protocol. Once the data of the PC is mounted on the terminal in a form of a virtual SD card, all applications on the terminal access the data of the PC in a similar way of accessing a local SD card.

The access mode in which the terminal accesses the data of the PC is previously defined. Therefore, the PC periodically sends a control request to the terminal. The terminal returns, to the PC, a message that includes an operation instruction for accessing the data of the PC only after receiving the control request sent by the PC. This is because in a USB protocol in primary/secondary mode, as a secondary device, the terminal cannot directly send the operation instruction to the PC.

During actual application, before the terminal returns the operation instruction to the PC, an operation instruction is triggered in the mass storage driver on the terminal when an upper-layer application program accesses data, for example, when the upper-layer program needs to delete a file. For the deletion command, an operation instruction is returned to the PC in a control request periodically sent by the PC. After receiving the instruction, the customized USB upper-layer application driver on the PC deletes the file. Then, the PC sends a file deletion result to the terminal in a new control request. After receiving the result, the customized mass storage driver notifies the result to the upper-layer application program in a call and return manner. The deletion result returning manner is similar to result returning when the upper-layer application calls and deletes a file in a local SD card. Similarly, when an upper-layer application program needs to traverse files, the upper-layer application program calls the customized mass storage driver on the terminal to trigger a file traversal operation instruction. The instruction is transferred to the customized USB upper-layer application driver on the PC in a return instruction of a control request of the PC. After obtaining the operation instruction, the customized USB upper-layer application driver traverses the files and sends a traversal result to the customized mass storage driver on a terminal side in a new control request. The customized mass storage driver notifies information about the traversed files to the upper-layer application program in a driver call and return manner. The file information and information returned when the upper-layer application program calls and traverses files in a local SD card are completely consistent in format. By analogy, all commands for accessing the customized mass_storage driver by an upper-layer application are returned to the customized USB upper-layer application driver on the PC in a response to a control request actively requested by the PC. After executing the command, the customized USB upper-layer application driver on the PC sends a result to the customized mass storage driver on the terminal in a new control request. The result is notified to the upper-layer application program in a standard driver return manner of the mass storage driver. In this way, access to a hardware disk of the PC mounted on the terminal is completely consistent with access to a local SD card. The terminal receives an operation instruction entered for data of the PC by a user on the user interface. For example, when the data of the PC is displayed on the user interface of the terminal, and the user needs to delete a specific piece of data on the PC, the user may click an operation option for deleting the data, to trigger an operation instruction corresponding to the operation option. In this way, the terminal can receive the operation instruction and returns the operation instruction to the PC based on a control request received from the PC.

After receiving the operation instruction returned by the terminal, the PC performs a corresponding operation and sends an execution result to the terminal. In this way, the terminal can learn a specific situation about whether the PC has failed to execute the operation instruction or has succeeded. When the terminal learns that the PC fails to completely execute the operation instruction, the terminal may continue to send the operation instruction to the PC, so that the PC continues to execute the unfinished operation instruction, and so on, until the PC executes the entire operation instruction. Then, the PC re-enters a stage of periodically sending a control request. For example, after the PC sends a control request to the terminal, the terminal sends the PC a message without an operation instruction.

Implementation 2:

Before the terminal and the PC are connected, first, a customized mass storage driver is created on the terminal, and a customized USB upper-layer application driver is created on the PC. A same device descriptor, USB interface descriptor, endpoint descriptor in a USB interface, and the like are defined on the two drivers, to ensure that operation modes of the drivers are consistent after the terminal and the PC are connected by using the USB interface.

To implement an access mode in which the terminal accesses data of the PC, a USB functional interface corresponding to the access mode is developed. When the terminal is connected to the PC by using the USB interface, the PC is mapped to a USB functional interface corresponding to the access mode; and the PC automatically loads the customized USB upper-layer application driver based on corresponding USB functional interface information, to implement communication between the terminal and the PC.

To cooperate with the access mode in which the terminal accesses the data of the PC, the PC sends a control request to the terminal, so that the data of the PC is mounted on the terminal in a form of an SD card. For example, the PC is mounted on the terminal as a virtual storage, so that the terminal can display the data of the PC on a user interface of the terminal. In this way, a user can view the data of the PC on the user interface, so that the terminal receives an operation instruction entered for the data by the user on the user interface, and performs a corresponding operation.

For example, when the data of the PC is displayed on the user interface of the terminal, and the user needs to delete a specific piece of data on the PC, the user may click an operation option for deleting the data, to trigger an operation instruction corresponding to the operation option. In this way, the terminal can receive the operation instruction and executes the operation instruction.

After executing the operation instruction, the terminal displays an execution result on the user interface. In this way, the user can learn a specific situation about whether the terminal has failed to execute the operation instruction or has succeeded. After learning that the terminal failed to completely execute the operation instruction, the user continues to enter the operation instruction on the user interface, so that the terminal continues to execute the unfinished operation instruction, and so on, until the terminal executes the entire operation instruction. Then, the terminal may be in a temporary dormant state.

Figure 2B:
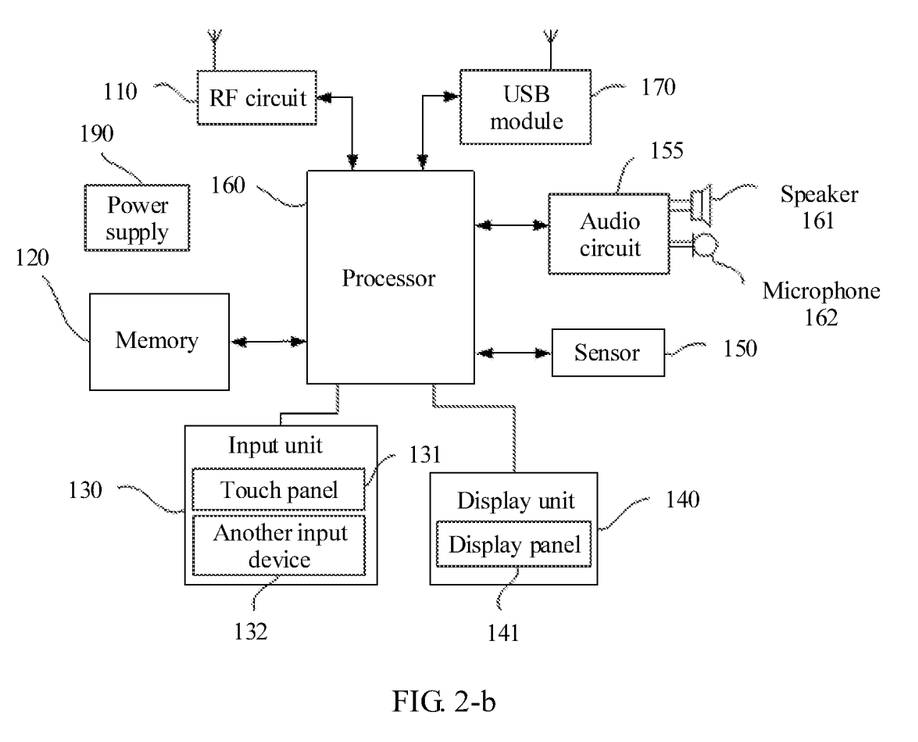

An embodiment of the present invention further provides a first device, as shown in FIG. 2-b. For ease of description, only parts related to this embodiment of the present invention are shown. For undisclosed technical details, refer to the method section in the embodiments of the present invention. The first device may be any terminal device such as a mobile phone, a tablet computer, a personal digital assistant (English full name: Personal Digital Assistant, PDA for short), a point of sales (English full name: Point of Sales, POS for short), or an in-vehicle computer. For example, the first device is a mobile phone.

FIG. 2-*b* shows a block diagram of a partial structure of a mobile phone related to the first device provided in this embodiment of the present invention. Referring to FIG. 2-*b*, the mobile phone includes components such as a radio frequency (English full name: Radio Frequency, RF for short) circuit 110, a memory 120, an input unit 130, a display unit 140, a sensor 150, an audio circuit 155, a USB module 170, a processor 160, and a power supply 190. A person skilled in the art can understand that the structure of the mobile phone shown in FIG. 2-*b* does not constitute a limitation on the mobile phone, and the mobile phone may include more or fewer components than those shown in the figure, or combine some components, or have a different component layout.

The following describes the composition parts of the mobile phone in detail with reference to FIG. 2-*b*.

The RF circuit 110 may be configured to receive and send information, or receive and send a signal during a call. Particularly, the RF circuit 110 receives an operation instruction intended for data of a second device from a user and sends the operation instruction to the processor 160 for processing. For example, the processor 160 processes data according to the operation instruction. Generally, the RF circuit 110 includes but is not limited to an antenna and at least one amplifier, transceiver, coupler, low noise amplifier (English full name: Low Noise Amplifier, LNA for short), duplexer, and the like. In addition, the RF circuit 110 may further communicate with a network and another device through wireless communication. The foregoing wireless communication may use any communications standard or protocol, including but not limited to Global System for Mobile Communications (English full name: Global System for Mobile Communications, GSM for short), General Packet Radio Service (English full name: General Packet Radio Service, GPRS for short), Code Division Multiple Access (English full name: Code Division Multiple Access, CDMA for short), Wideband Code Division Multiple Access (English full name: Wideband Code Division Multiple Access, WCDMA for short), Long Term Evolution (English full name: Long Term Evolution, LTE for short), e-mail, Short Messaging Service (English full name: Short Messaging Service, SMS for short), and the like.

The memory 120 may be configured to store a software program and a computer instruction. In this embodiment of the present invention, for example, the memory 120 stores the data of the second device. The processor 160 executes various functional applications and data processing of the mobile phone by running the software program and a module stored in the memory 120. The memory 120 may mainly include a program storage area and a data storage area. The program storage area may store an operating system, an application program required by at least one function (for example, a sound playing function or an image playing function), and the like. The data storage area may store data (for example, audio data or an address book) and the like created based on use of the mobile phone. In addition, the memory 120 may include a high-speed random access memory, or may further include a non-volatile memory, for example, at least one magnetic disk storage component, a flash storage component, or another volatile solid-state storage component.

The input unit 130 may be configured to receive entered digit or character information, to generate key signal input related to user setting and function control of the mobile phone. Specifically, the input unit 130 may include a touch panel 131 and another input device 132. The touch panel 131, also referred to as a touchscreen, may collect a touch operation performed by the user on or near the touch panel 131 (for example, an operation performed by the user on or near the touch panel 131 by using any proper object or accessory, such as a finger or a stylus), and drive a corresponding connection apparatus based on a preset program. For example, the user performs a touch operation on the touch panel 131 to enter an input instruction for an interface of second data. Optionally, the touch panel 131 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus and converts the touch information into contact coordinates; then sends the contact coordinates to the processor 160; and receives and executes a command sent by the processor 160. In addition, the touch panel 131 may be implemented by using a plurality of types such as a resistive type, a capacitive type, an infrared ray, and a surface acoustic wave. In addition to the touch panel 131, the input unit 130 may further include the another input device 132. Specifically, the another input device 132 may include but is not limited to one or more of a physical key board, a functional key (for example, a volume control key or an on/off key), a trackball, a mouse, a joystick, and the like.

The display unit 140 may be configured to display information entered by the user or information provided for the user and various menus of the mobile phone. In this embodiment of the present invention, for example, the display unit 140 displays the data of the second device or displays an interface to which the second device is mapped. The display unit 140 may include a display panel 141. Optionally, the display panel 141 may be configured in a form of a liquid crystal display (English full name: Liquid Crystal Display, LCD for short), an organic light-emitting diode (English full name: Organic Light-Emitting Diode, OLED for short), or the like. Further, the touch panel 1131 may cover the display panel 141. When detecting the touch operation on or near the touch panel 131, the touch panel 131 transfers the touch operation to the processor 160 to determine a type of the touch event. Then, the processor 160 provides corresponding visual output on the display panel 141 based on the type of the touch event.

The user can use the mobile phone to send and receive an email, browse a web page, access streaming media, and the like by using the USB module 170. The USB module 170 provides the user with wireless broadband Internet access, for example, accessing the data of the second device by using the USB module. Although FIG. 2-*b* shows the USB module 170, it can be understood that the USB module 170 is not a mandatory part of the mobile phone and can certainly be omitted as required without changing the essence of the present invention.

The processor 160 is a control center of the mobile phone and connects all parts of the entire mobile phone by using various interfaces and lines. The processor 160 executes various functions and processes data of the mobile phone by running or executing the software program and/or the module stored in the memory 120 and calling data stored in the memory 120, to perform overall monitoring of the mobile phone, for example, processing the data of the second device. Optionally, the processor 160 may include one or more processing units. Preferably, an application processor and a modem processor may be integrated into the processor 160. The application processor mainly processes an operating system, a user interface, an application program, and the like. The modem processor mainly processes wireless communication. It can be understood that the modem processor may be not integrated into the processor 160.

The mobile phone further includes the power supply 190 (for example, a battery) that supplies power to each part. Preferably, the power supply is logically connected to the processor 160 by using a power supply management system, to manage functions such as charging, discharging, and power consumption by using the power supply management system.

Although not illustrated, the mobile phone may further include a camera, a Bluetooth module, and the like. Details are not described herein.

In this embodiment of the present invention, the display unit 140 is configured to display the interface to which the second device is mapped;

the input unit 130 is configured to receive an instruction entered for the interface;

the processor 160 is configured to instruct, according to the entered instruction, the display unit to display the data of the second device;

the display unit 140 is further configured to display the data of the second device;

the input unit 130 is further configured to receive an operation instruction entered for the data; and the processor 160 is further configured to process the data according to the operation instruction.

In some possible implementations, the operation instruction includes a selection operation instruction and a processing operation instruction, where the input unit 130 is further configured to receive the selection operation instruction entered for the data, and determine target data; and receive the processing operation instruction entered for the target data; and the processor 160 is specifically configured to determine the target data according to the selection operation instruction, and perform an operation corresponding to the processing operation instruction on the target data according to the processing operation instruction.

In some other possible implementations, the input unit 130 is further configured to: before the processor 160 processes the data according to the operation instruction, receive a control request sent by the second device; and the processor 160 is further configured to send the operation instruction to the second device based on the control request, where the operation instruction is used to instruct the second device to process the data according to the operation instruction.

The structure of the first device shown in FIG. 2-*b* is also applicable to the second device in this embodiment of the present invention. For details, refer to the structure shown in FIG. 2-*b*. Details are not described herein again.

The processor 160 is configured to generate the control request; and the USB module 170 is configured to send the control request to the first device, where the control request is used to instruct the first device to send the operation instruction to the operation device.

In some possible implementations, the USB module 170 is further configured to receive the operation instruction sent by the first device; and the processor 160 is further configured to process the target data according to the operation instruction.

Application scenarios of the present invention are first described before this embodiment of the present invention is described. For example, a first device is a mobile phone and a second device is a PC. A customized USB upper-layer application driver is installed on the PC, and a customized mass storage driver is implemented on the mobile phone. The mobile phone and the PC are connected by using a USB interface. Data of the PC is mounted on the mobile phone in a form of a virtual SD card, and the mobile phone accesses the data of the PC by controlling the PC. In some other scenarios, for example, the first device is a smart router and the second device is a PC. The smart router is connected to the PC by using a USB interface, and the smart router uses a hard disk of the PC as a storage device of the smart router, thereby effectively improving a data access capability. In some other scenarios, for example, the first device is a mobile phone and the second device is a router. As the second device, the router usually does not provide a man-machine operation interface. The mobile phone usually accesses the router indirectly by using another approach (for example, a web television or an online PC). Usually, no direct operation function (that is, data addition, deletion, modification, or the like) is provided in this indirect access manner. However, in the present invention, the mobile phone is directly connected to the router by using a USB interface, and data of the router can be accessed from the mobile phone in a form of a virtual local file. In addition, the data of the router can be added, deleted, modified, and the like.

Figure 3:
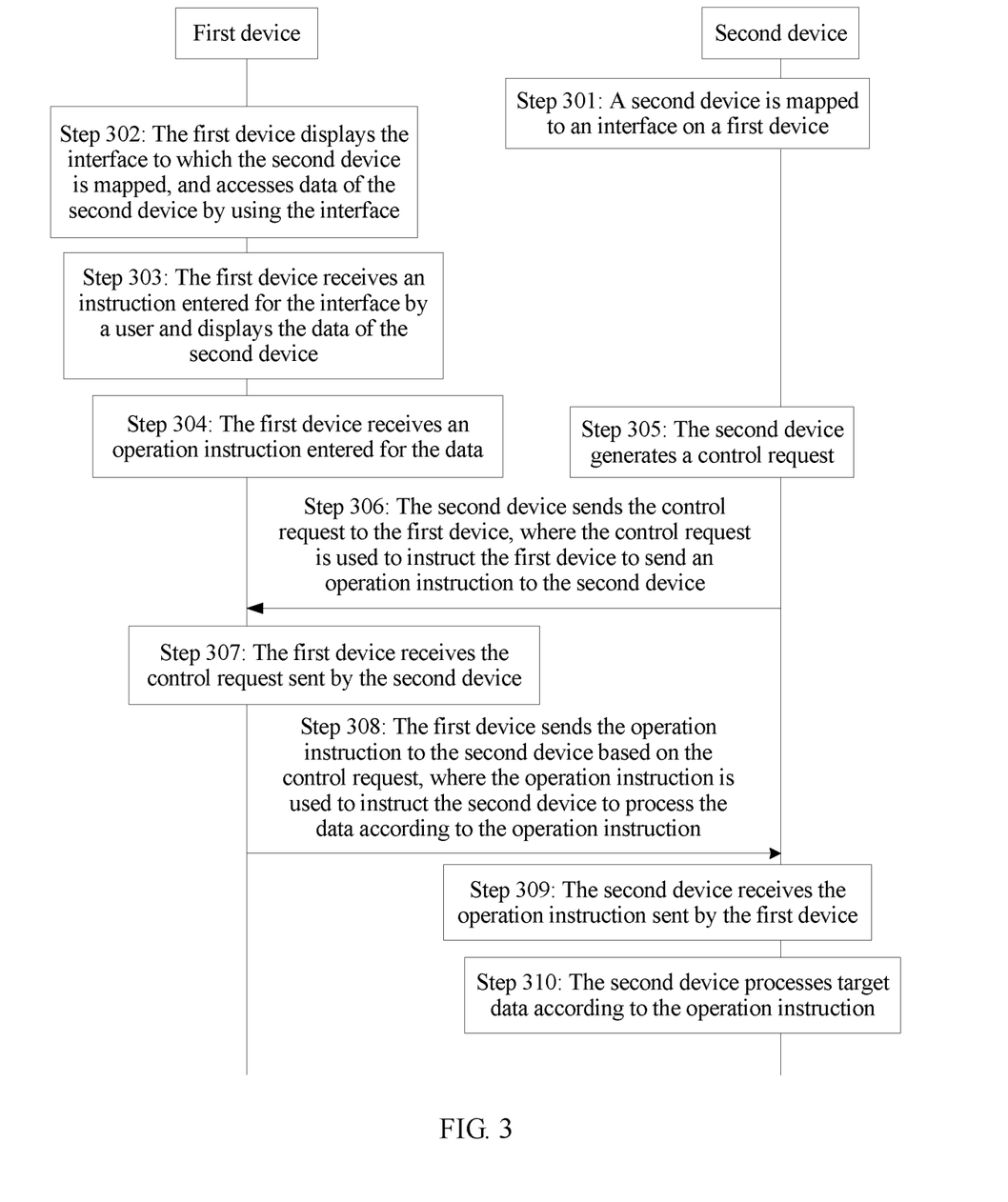
FIG. 3 is a schematic diagram of an embodiment of data access according to an embodiment of the present invention.

Referring to FIG. 3, FIG. 3 is a schematic diagram of an embodiment of data access according to an embodiment of the present invention. The method is applied to a first device and a second device, and the first device and the second device are connected by using a USB interface. A specific procedure of this embodiment is as follows.

Step 301: The second device is mapped to an interface on the first device.

In this embodiment of the present invention, after the first device and the second device are connected by using the USB interface, the second device is mapped to the interface on the first device. The interface may be a menu option or an icon. This is not specifically limited herein. It can be learned that the second device is mounted on the first device as a virtual storage unit, to expand storage space of the first device.

Step 302: The first device displays the interface to which the second device is mapped, and accesses data of the second device by using the interface.

During actual application, the first device displays, on a user interface, the interface to which the second device is mapped, and accesses the data of the second device by using the interface. A user may view the data of the second device on the user interface and determines an input instruction for the data.

To implement an access mode in which the first device accesses the data of the second device, a USB functional interface corresponding to the access mode is developed. The data is text, a picture, audio, a video, and the like stored in a hard disk on the second device. This is not specifically limited herein.

When the first device is connected to the second device by using the USB interface for a first time, the second device is mapped to a USB functional interface through which the first device accesses the data of the second device. The second device identifies an interface mode corresponding to the USB functional interface, to automatically load a customized USB upper-layer application driver and run the customized USB upper-layer application driver in a kernel of the second device, featuring a fast operating speed. Because information about the first device defined on the customized USB upper-layer application driver on the second device is the same as information about the first device defined on a customized mass storage driver on the first device, this ensures that operation modes of the customized mass storage driver and the customized USB upper-layer application driver are consistent. After the customized mass storage driver is bound to the customized USB upper-layer application driver, the second device communicates with the first device based on the interface mode defined in the USB functional interface.

Step 303: The first device receives an instruction entered for the interface by a user and displays the data of the second device.

Step 304: The first device receives an operation instruction entered for the data.

In some possible implementations, that the first device receives an operation instruction entered for the data specifically includes:

receiving, by the first device, a selection operation instruction entered for the data, and determining target data; and receiving, by the first device, a processing operation instruction entered for the target data.

That the first device processes the data according to the operation instruction specifically includes:

performing, by the first device, an operation corresponding to the processing operation instruction on the target data according to the processing operation instruction.

Step 305: The second device generates a control request.

Step 306: The second device sends the control request to the first device, where the control request is used to instruct the first device to send an operation instruction to the second device.

Step 307: The first device receives the control request sent by the second device.

Step 308: The first device sends the operation instruction to the second device based on the control request, where the operation instruction is used to instruct the second device to process the data according to the operation instruction.

The access mode has been customized before the first device accesses the data of the second device, and therefore, the first device accesses the data of the second device based on the customized access mode. For example, the first device needs to send the operation instruction to the second device in response to the control request sent by the second device, so that the second device processes the target data according to the operation instruction. The operation is simple, and the first device accesses the data of the second device.

In this embodiment of the present invention, when the first device determines to access the data of the second device, the first device returns a first operation instruction to the second device based on the control request. After receiving the first operation instruction, the second device learns that the first device needs to access the data of the second device, executes the first operation instruction, and sends a result of executing the first operation instruction to the first device. The first operation instruction is any type of operation instruction. The control command includes traversing, adding, deleting, modifying, or transmitting the data of the second device, and further includes writing, reading, creating, moving, or copying the data of the second device or the like. There are a plurality of types of specific operation instructions. This is not specifically limited herein.

Step 309: The second device receives the operation instruction sent by the first device.

Step 310: The second device processes target data according to the operation instruction.

During actual application, for example, when the first device determines to modify data of the second device, after receiving a control request sent by the second device, the first device returns an operation instruction to the second device based on the control request. If the operation instruction is to modify a specific piece of data of the second device, after receiving the message, the second device modifies the corresponding data of the second device. For another example, when the first device needs to copy a specific piece of data of the second device, after receiving a control request sent by the second device, the first device returns an operation instruction to the second device based on the control request. If the operation instruction is to copy a specific piece of data of the second device, after receiving the message, the second device copies the corresponding data of the second device. Assuming that the second device cannot copy all required data in one batch, the data can be copied for a plurality of times.

Different from the prior art, the present invention is not limited to merely writing and reading the data of the second device. The data of the second device may further be deleted, modified, copied, and the like. It can be learned that modes of operation on the data of the second device are more diversified and flexible, thereby improving flexibility of interaction manners between the first device and the second device.

During actual application, a user interface is provided on the first device, and a result of executing the operation instruction sent by the second device is displayed on the user interface, so that the user learns the specific execution result. For example, after modifying a specific piece of data, the second device sends a modification result to the first device. After receiving the modification result, the first device displays corresponding information on the user interface, facilitating browsing by the user.

In some possible implementations, to reduce power consumption of USB transmission, when determining not to access the data of the second device, the first device sends, to the second device, a message that does not carry an operation instruction, so that the second device learns that the first device does not need to access data for the moment. However, to meet a data access requirement of the first device, a timer is set on the second device, and the second device sends a control request to the first device at an interval of a time period T. The time period T can be adjusted at any time based on actual application. Polling occupation reduces as the time period T is adjusted to a larger value. Assuming that T is 100 ms, it indicates that after the second device sends a control request, if the first device has no data access requirement, the second device sends the control request to the first device again 100 ms later. USB bandwidth is barely affected when a polling interval is set to 100 ms, and a response time of 100 ms also meets requirements of different regular application scenarios. If the second device has a relatively high requirement on performance, for example, the second device has a relatively high requirement on power consumption of a central processing unit (Central Processing Unit, CPU), T may be set to 500 ms. This can effectively reduce power consumption of USB transmission and increase a demand for CPU power consumption, but this has no impact on an application scenario that does not have a high requirement on real-time performance. Therefore, T may be determined based on actual application. This is not specifically limited herein.

In the prior art, a first device can only passively receive a command sent by a second device and respond to the command sent by the second device. However, in this embodiment of the present invention, the customized mass storage driver is installed on the first device and the customized USB upper-layer application driver is installed on the second device. Same information is customized for the mass storage driver and the USB upper-layer application driver, for example, a device descriptor, a USB interface descriptor, an endpoint descriptor in the USB interface, and the like. The access mode for accessing the data of the second device is defined in the USB interface descriptor. After the first device and the second device are connected by using the USB interface, the second device identifies the access mode corresponding to the USB interface and then automatically loads the customized USB upper-layer application driver on the second device. Because the information defined on the customized USB upper-layer application driver is the same as the information defined on the customized mass storage driver on the first device, this ensures that operation modes of the customized USB upper-layer application driver and the customized mass storage driver are consistent, and the first device accesses the data of the second device.

Figure 4:
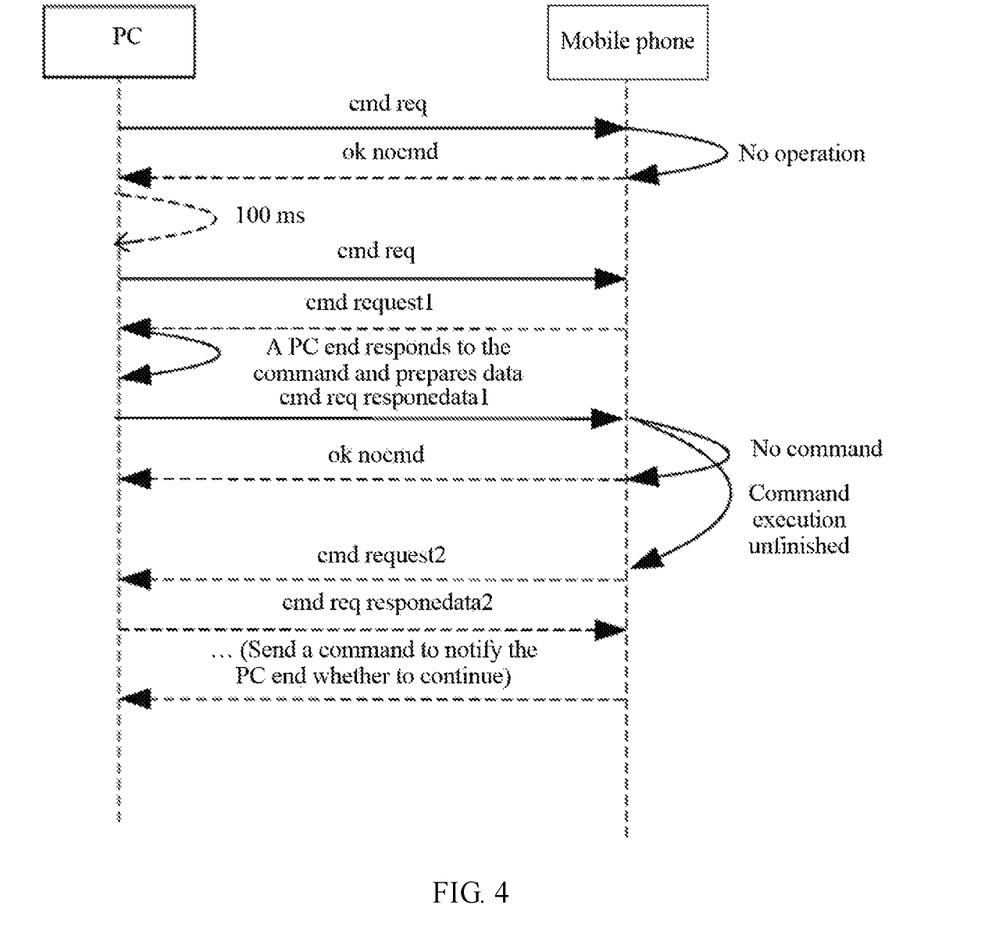
FIG. 4 is a schematic diagram of another embodiment of data access according to an embodiment of the present invention.

Referring to FIG. 4, FIG. 4 is a schematic diagram of another embodiment of data access according to an embodiment of the present invention. For example, a first device is a mobile phone, and a second device is a PC. A specific procedure is as follows: The PC sends a control request (cmd req) to the mobile phone. After receiving the control request, the mobile phone determines whether to access data of the PC. If the mobile phone does not need to access the data of the PC, the mobile phone sends, to the PC, a message (ok nocmd) that does not carry an operation instruction. After a time period T (for example, 100 ms), the PC sends a control request (cmd req) to the mobile phone again. When the mobile phone needs to access the data of the PC, the mobile phone returns, to the PC, a message (cmd request1) that carries a first operation instruction. After receiving the message, the PC prepares result data corresponding to the first operation instruction, and further sends the corresponding result data (cmd req responedata1) to the mobile phone. After the mobile phone receives the corresponding result data, if there is no other command, the mobile phone sends, to the PC, a message (ok nocmd) that does not carry an operation instruction. When the mobile phone confirms that the PC does not finish executing the first operation instruction, the mobile phone sends, to the PC again, a message (cmd request2) that carries a second operation instruction. After receiving the message, the PC executes the second operation instruction, prepares result data corresponding to the second operation instruction, and further sends the corresponding result data (cmd req responedata2) to the mobile phone. After receiving the corresponding result data, the mobile phone performs the foregoing steps again, so that the PC end learns whether the mobile phone still needs to access the data, and so on. Details are not described herein again.

To better implement the foregoing related method in the embodiments of the present invention, the following further provides a related system to cooperate with the foregoing method.

Figure 5:
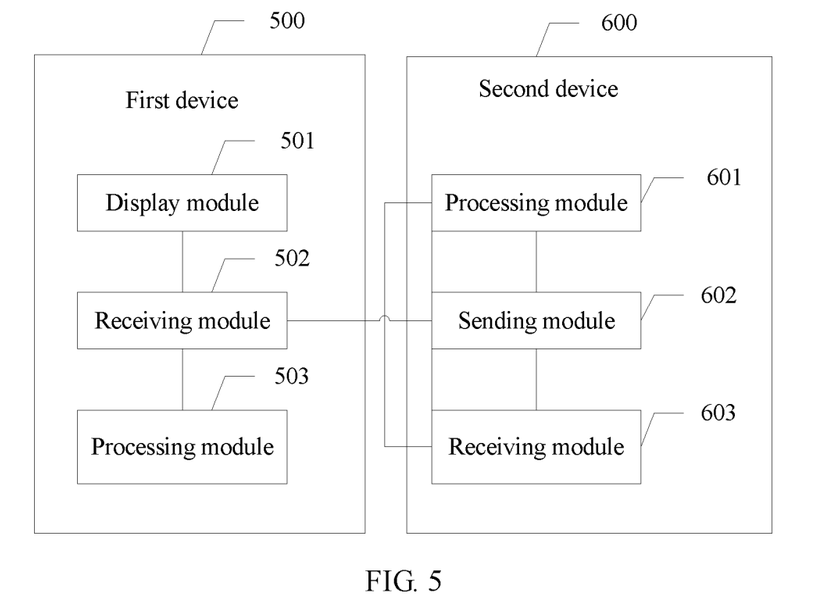
FIG. 5 is a schematic structural diagram of a data access system according to an embodiment of the present invention.

Referring to FIG. 5, FIG. 5 is a schematic structural diagram of a data access system according to an embodiment of the present invention. The system includes a first device 500 and a second device 600. The first device 500 is connected to the second device 600 by using a Universal Serial Bus USB interface. The first device includes a display module 501, a receiving module 502, and a processing module 503.

The display module 501 is configured to display an interface to which the second device is mapped;

the receiving module 502 is configured to receive an instruction entered for the interface displayed by the display module 501;

the processing module 503 is configured to instruct, according to the entered instruction received by the receiving module 502, the display module 501 to display data of the second device;

the display module 501 is further configured to display the data of the second device;

the receiving module 502 is further configured to receive an operation instruction entered for the data; and the processing module 503 is further configured to process the data according to the operation instruction received by the receiving module 502.

In some possible implementations, the operation instruction includes a selection operation instruction and a processing operation instruction, where the receiving module 502 is further configured to receive the selection operation instruction entered for the data and receive the processing operation instruction entered for the target data; and the processing module 503 is configured to determine the target data according to the selection operation instruction, and perform an operation corresponding to the processing operation instruction on the target data according to the processing operation instruction.

In some other possible implementations, the receiving module 502 is further configured to: before the processing module 503 processes the data according to the operation instruction, receive a control request sent by the second device; and the processing module 503 is further configured to send the operation instruction to the second device based on the control request, where the operation instruction is used to instruct the second device to process the data according to the operation instruction.

In some other possible implementations, a mass storage driver is installed on the first device, and a parameter for interacting with the second device is defined on the mass storage driver.

In some other possible implementations, the parameter includes USB functional interface information, and the USB functional interface information includes information about an access mode in which the first device accesses the data of the second device.

In some possible implementations, the first terminal is a terminal.

The second device 600 is connected to the first device by using the Universal Serial Bus USB interface. A USB upper-layer application driver is installed on the operation device. A parameter for interacting with the first device is defined on the USB upper-layer application driver. The second device includes a processing module 601, a sending module 602, and a receiving module 603.

The processing module 601 is configured to generate a control request; and the sending module 602 is configured to send the control request to the first device, where the control request is used to instruct the first device to send an operation instruction to the operation device.

In some possible implementations, the second device 600 further includes:

the receiving module 603, configured to receive the operation instruction sent by the first device; and the processing module 601, further configured to process target data according to the operation instruction received by the receiving module 603.

In some other possible implementations, the parameter includes USB functional interface information, and the USB functional interface information includes information about an access mode in which the first device accesses the data of the operation device.

In some possible implementations, the second device 600 is a personal computer PC.

It can be learned that the first device is connected to the second device by using the USB interface. This effectively improves a data transmission rate in comparison with the prior art. The first device displays the interface to which the second device is mapped and accesses the data of the second device by using the interface. It can be learned that the second device serves as a virtual storage unit of the first device, thereby expanding storage space of the first device. In this way, the first device can display the data of the second device when receiving the instruction entered for the interface. Further, the first device receives the operation instruction entered for the data and processes the data according to the operation instruction. The operation is simple, and no extra IP address needs to be configured, thereby improving flexibility of interaction between the devices. Different from the prior art, no network needs to be connected in this embodiment of the present invention, thereby reducing consumption of network communication.

In a possible implementation, the sending module and the receiving module may be software modules and can be implemented in a transceiver of a portable electronic device. The processing module may also be a software module and can be implemented in a processor of a computer system, or may be a specific integrated circuit.

It should be noted that the first device and the second device shown in FIG. 5 may correspond to the first device and the second device in the method embodiment shown in FIG. 3, and the foregoing and other operations and/or functions of the units in the first device or the second device are respectively intended to implement corresponding procedures of the method shown in FIG. 3. For brevity, details are not described herein.

In the foregoing embodiments, the descriptions of the embodiments have respective focuses. For a part that is not described in detail in an embodiment, reference may be made to related descriptions in other embodiments.

It may be clearly understood by a person skilled in the art that, for the purpose of convenient and brief description, for a detailed working process of the foregoing portable electronic device, computer-readable storage medium, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to implement the technical solutions provided in the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The present invention is described in detail above. The principle and implementation of the present invention are described herein through specific examples. The description about the embodiments is merely provided to help understand the method and core ideas of the present invention. In addition, a person of ordinary skill in the art can make variations to the present invention in terms of the specific implementations and application scopes according to the ideas of the present invention. Therefore, the content of this specification shall not be construed as a limitation to the present invention.

What is claimed is:

1. A data access method applied to a first device having a mass storage driver, wherein the first device is coupled to a second device having a Universal Serial Bus (USB) upper-layer application driver and a USB interface, and wherein the method comprises:

mapping the second device to the first device using the USB interface, whereby data residing in memory of the second device is accessible to the first device in the form of a virtual secure digital (SD) card;

displaying, by the first device, a user interface to which the second device is mapped;

receiving, by the first device, periodic control requests from the second device;

either:

(a) sending, by the first device, an acknowledgment alone; or (b) performing all of the following:
Sending, by the first device an acknowledgement including a first operation instruction;
receiving, by the first device from the second device, response data corresponding to the first operation instruction;
accessing, by the first device user interface, data of the second device;
receiving, by the first device, an accessing instruction entered by the user interface;
displaying, by the first device, the data of the second device;
receiving, by the first device, a second operation instruction entered for the data; and
processing, by the first device, the data according to the second operation instruction.

2. The method of claim 1, wherein receiving the second operation instruction entered for the data comprises:
receiving a selection operation instruction entered for the data;
identifying target data;
receiving a processing operation instruction entered for the target data; and
processing the target data according to an operation corresponding to the processing operation instruction on the target data.

3. The method of claim 1, wherein before processing the data according to the second operation instruction, the method further comprises:
receiving a control request from the second device; and
processing the data according to the second operation instruction by sending the operation instruction to the second device based on the control request, and
wherein the operation instruction instructs the second device to process the data according to the second operation instruction.

4. The method of claim 1, further comprising defining a same parameter on the mass storage driver and the USB upper-layer application driver, wherein the first device exchanges data with the second device based on the parameter.

5. The method of claim 4, wherein the parameter comprises USB functional interface information, and wherein the USB functional interface information comprises information about an access mode whereby the first device accesses the data of the second device.

6. The method of claim 1, wherein the first device comprises a mobile terminal, and wherein the second device comprises a personal computer (PC).

7. The data access method of claim 1 further comprising:
in response to receiving the response data corresponding to the first operation instruction, the first device responsively sending either: an acknowledgment alone, or an acknowledgement including an operation instruction.

8. A data access method applied to a second device having a Universal Serial Bus (USB) interface and USB upper-layer application driver, wherein the second device is coupled to a first device, wherein a parameter for interacting with the first device is defined on the USB upper-layer application driver, and wherein the method comprises:
mapping the second device to the first device using the USB interface, whereby, using the parameter, data residing in memory of the second device is accessible to the first device in the form of a virtual secure digital (SD) card;
generating, by the second device, a control request;
sending, by the second device, the control request to the first device, wherein the control request instructs the first device to send an operation instruction to the second device
either:
(a) receiving, from the first device, an acknowledgment alone; or
(b) performing the following:
receiving, from the first device, an acknowledgement including a first operation instruction; and
sending, to the first device, response data corresponding to the first operation instruction.

9. The method of claim 8, further comprising:
receiving, by the second device, the first operation instruction from the first device; and
processing, by the second device, target data according to the operation instruction.

10. The method of claim 8, wherein the parameter comprises USB functional interface information, and wherein the USB functional interface information comprises information about an access mode whereby the first device accesses data of the second device.

11. The method of claim 8, wherein the first device comprises a mobile terminal, and wherein the second device comprises a personal computer (PC).

12. The data access method of claim 8 further comprising in response to receiving an acknowledgement from the first device, the second device sending either: a periodic control request, or response data corresponding to an operation instruction.

13. An operation device coupled to a second device having a Universal Serial Bus (USB) upper-layer application driver and a USB interface, wherein the operation device comprises:
a bus;
a display coupled to the bus and configured to display an interface to which the second device is mapped, whereby data residing in memory of the second device is accessible to the first device in the form of a virtual secure digital (SD) card;
an input device coupled to the bus and configured to receive an accessing instruction from the interface; and
a processor coupled to the bus and configured to:
receive periodic control requests from the second device;
cause the operation device; to responsively send either;
(a) an acknowledgment alone, or
(b) an acknowledgement including a first operation instruction;
receive, from the second device, response data corresponding to the first operation instruction;
instruct, according to the entered accessing instruction, the display to display data of the second device,
wherein the display is further configured to display the data of the second device,
wherein the input device is further configured to receive a second operation instruction entered for the data, and
wherein the processor is further configured to process the data according to the second operation instruction.

14. The operation device of claim 13, wherein the first operation instruction comprises a selection operation instruction and a processing operation instruction, and wherein the input device is further configured to:
receive the selection operation instruction entered for the data; and
receive the processing operation instruction entered for target data, wherein the processor is further configured to:
  determine the target data according to the selection operation instruction; and
  perform an operation corresponding to the processing operation instruction on the target data according to the processing operation instruction.

15. The operation device of claim 13, wherein the input device is further configured to receive a control request from the second device before the processor processes the data according to the first operation instruction, wherein the processor is further configured to send the first operation instruction to the second device based on the control request, and wherein the first operation instruction instructs the second device to process the data according to the first operation instruction.

16. The operation device of claim 13, wherein a mass storage driver is installed on the operation device, and wherein a parameter for interacting with the second device resides on the mass storage driver.

17. The operation device of claim 16, wherein the parameter comprises USB functional interface information, and wherein the USB functional interface information comprises information about an access mode whereby the operation device accesses the data of the second device.

18. An operation device having a Universal Serial Bus (USB) interface and a USB upper-layer application driver, wherein the operation device is coupled to a first device, wherein a parameter for interacting with the first device is defined on the USB upper-layer application driver, and wherein the operation device comprises:
  a bus;
  a processor coupled to the bus and configured to:
    generate a control request;
    receive, from the first device either an acknowledgment alone, or an acknowledgement including an operation instruction; and
    cause the operation device to send, to the first device, response data corresponding to the operation instruction, whereby data residing in memory of the second device is accessible to the first device in the form of a virtual secure digital (SD) card.

19. The operation device of claim 18, wherein the USB device is further configured to receive the operation instruction from the first device, and wherein the processor is further configured to process data according to the operation instruction.

20. The operation device of claim 18, wherein the parameter comprises USB functional interface information comprising information about an access mode.

* * * * *